United States Patent
Kinoshita et al.

(10) Patent No.: US 7,259,947 B2
(45) Date of Patent: Aug. 21, 2007

(54) PHASE CONTROL SWITCHING DEVICE

(75) Inventors: Sadayuki Kinoshita, Tokyo (JP); Hiroki Ito, Tokyo (JP); Haruhiko Kohyama, Tokyo (JP); Kenji Kamei, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 451 days.

(21) Appl. No.: 11/043,107

(22) Filed: Jan. 27, 2005

(65) Prior Publication Data

US 2006/0018068 A1    Jan. 26, 2006

(30) Foreign Application Priority Data

Jul. 22, 2004    (JP)    ............... 2004-214342

(51) Int. Cl.
*H02H 3/18* (2006.01)
(52) U.S. Cl. .................................................. 361/85
(58) Field of Classification Search ............. 361/85, 361/93.1, 159, 87; 307/127, 139
See application file for complete search history.

(56) References Cited

U.S. PATENT DOCUMENTS

| | | | | |
|---|---|---|---|---|
| 2,484,575 | A * | 10/1949 | Livingston | 323/209 |
| 6,172,863 | B1 * | 1/2001 | Ito et al. | 361/79 |
| 6,392,390 | B1 * | 5/2002 | Ito et al. | 323/209 |
| 6,493,203 | B1 | 12/2002 | Ito et al. | |
| 7,095,139 | B2 * | 8/2006 | Tsutada et al. | 307/129 |
| 2004/0124814 | A1 | 7/2004 | Tsutada et al. | |

FOREIGN PATENT DOCUMENTS

JP    2-179220    7/1990

* cited by examiner

*Primary Examiner*—Michael Sherry
*Assistant Examiner*—Biris Benenson
(74) *Attorney, Agent, or Firm*—Leydig, Voit & Mayer, Ltd.

(57) ABSTRACT

Respective contact terminals in respective arc-suppressing spaces of respective breakers are opened at a voltage zero point of any phase of three phases, simultaneously among the three phases. If current breaking is carried out for the three phases at the same time, when the breakers of the three phases are opened, the residual magnetic levels of the respective phases of a transformer can be controlled so that the residual magnetic flux level of the phase opened at the voltage zero point is maximum (for example, −2K or +2K) and the residual magnetic flux level of the other two phases are opposite in polarity to the residual magnetic flux level of the phase concerned and equal to substantially the same residual magnetic flux (for example, +K and +K or −K and −K) which is equal to about one half of the residual magnetic flux level of the phase concerned. Accordingly, by throwing the phase broken at the voltage zero point at a first time, the difference in residual magnetic flux between the second throwing phase and the third throwing phase just after the first phase is thrown can be substantially nullified.

8 Claims, 4 Drawing Sheets

PHASE CONTROL SWITCHING DEVICE

BACKGROUND OF THE INVENTION

1. Field of the Invention

The present invention relates to a phase control switching device for controlling switching time of a switching device for electrical power, such as a breaker, in consideration of residual magnetic flux of the core of a transformation device of electrical energy, such as a transformer or a shunt reactor, whereby occurrence of transient exciting incoming current caused by switching of the switching device, which is harmful to the transformation device connected to a power system, can be suppressed to the minimum level.

2. Description of the Related Art

There is known a phase control switching device in which when residual magnetic flux exists in the core of a transformer or the core of a shunt reactor, a transitional switch surge phenomenon is suppressed by estimating the residual magnetic flux of each phase of the transformer or shunt reactor and operating a breaker at the optimal throw-in timing corresponding to the residual magnetic flux of each phase (for example, JP-A-2001-218354 (see paragraph numbers [0004], [0007], [0008], FIGS. 1, 24).

In the conventional phase control switching device, it is assumed that breaking is carried out at a current zero point which occurs at an interval of an electrical degree of 60° in commercial frequency every phase when each breaker of three phases is opened, and thus the residual magnetic flux of the first breaking phase is equal to zero while the residual magnetic flux of the second breaking phase or third breaking phase is equal to +K or −K. Therefore, even when the closing operation of the breaker is controlled in consideration of the residual magnetic flux of each phase, there is a difference in residual magnetic flux value between a second throwing phase (for example, a phase of −K in residual magnetic flux) and a third throwing phase (for example, a phase of zero in residual magnetic flux) just after the first phase (for example, a phase of +K in residual magnetic flux) is thrown. Therefore, when the second throwing phase and the third throwing phase is thrown under this state, any one or both of the second throwing phase and the third throwing phase are thrown at an electrical degree at which the residual magnetic flux and the stationary magnetic flux are not coincident with each other. Therefore, a transitional phenomenon of magnetic flux occurs, and a DC magnetic flux is superposed on any one or both of the second throwing phase and the third throwing phase. Accordingly, there is a drawback that transitional exciting incoming current caused by switching of the switching device which is severe to a transformer cannot be suppressed to the minimum level when magnetic saturation occurs.

SUMMARY OF THE INVENTION

The present invention has been implemented in view of the foregoing situation, and has an object to provide a phase control switching device for controlling the opening/closing operation of a breaker so that the difference in residual magnetic flux between a second throwing phase and a third throwing phase is substantially equal to zero even just after first phase is thrown when current is broken for three phases simultaneously with opening of the breaker is carried out.

A phase control switching device according to the present invention comprises a transforming unit connected to a power system, a breaker of each phase, which is connected to the transforming unit and opened to break failure current and load current of the transforming unit and thrown to excite the transforming unit, a voltage measuring unit for measuring the voltages at the transforming unit side and the power system side of the breaker of each phase, and a phase control switching operation processor for carrying out switching operation of the breaker of each phase in consideration of the residual magnetic flux of the transforming unit, wherein when the breaker of each phase receives an opening instruction, the phase control switching operation processor estimates a periodical zero point of one phase from the phase of a voltage waveform measured by the voltage measuring unit equipped to each phase and opens each contact terminal of the breaker in the vicinity of the voltage zero point of one phase at the same time with respect to three phases, and when the breaker of each phase receives a closing instruction, the phase control switching operation processor estimates a periodical zero point of the one phase from the phase of the voltage waveform of the one phase measured by the voltage measuring unit of the one phase, sets the one phase opened at the voltage zero point as a first throwing phase, throws the one phase at a throwing point at which the exciting incoming current at the throwing time is substantially minimum in consideration of the residual magnetic flux of the transforming unit and throws the other phases in the vicinity of the voltage zero point of the one phase after the throwing point of the one phase.

Furthermore, a phase control switching device according to the invention is equipped with a transforming unit connected to the power system, a breaker of each phase which is opened to break failure current or load current of the transforming unit and thrown to excite the transforming unit, a voltage measuring unit for measuring the voltages at the transforming unit side and the power system side of the breaker of any specific phase of three phases, and a phase control switching operation processor for carrying out the switching operation of the breaker of each phase in consideration of the residual magnetic flux of the transforming unit, wherein when the breaker of each phase receives an opening instruction, the phase control switching operation processor sets the specific phase, estimates a periodical zero point of the specific phase on the basis of the phase of a voltage wave form measured by the voltage measuring unit equipped to the specific phase, opens each contact terminal of the breaker in the vicinity of the voltage zero point of the specific phase at the same time with respect to the three phases, and when the breaker of each phase receives a closing instruction, the phase control switching operation processor estimates the periodic zero point of the specific phase from the phase of the voltage waveform of the specific phase measured by the voltage measuring unit of the specific phase, sets the specific phase opened at the voltage zero point as a first throwing phase and throws the specific phase at a throwing point at which the exciting incoming current at the throwing point is minimum in consideration of the residual magnetic flux of the transforming unit, and throws the other phases in the vicinity of the voltage zero point of the specific phase after the throwing point of the specific phase.

According to the phase control switching device of the present invention, each contact terminal of each breaker is opened at the voltage zero point of any one phase of three phases or a set specific phase at the same time with respect to the three phases, and the phase opened at the voltage zero point is set as a first throwing phase. When current is broken for the three phases simultaneously with the opening of the respective breakers of the three phases, the residual magnetic flux level of each phase of the transforming unit can be controlled so that the residual magnetic flux level of the phase broken at the voltage zero point is maximum (for example, −2K or +2K) while the residual magnetic flux levels of the other two phases are set to be opposite in polarity to the residual magnetic flux level of the phase concerned and equal to substantially the same residual magnetic flux level (for example, +K and +K or −K and −K) which is equal to about a half of the residual magnetic flux level of the phase concerned. Therefore, by first throwing the phase broken at the voltage zero point, the difference in residual magnetic flux between the second throwing phase and the third throwing phase just before the first phase is thrown can be made substantially equal to zero. Accordingly, since the second throwing phase and the third throwing phase can be thrown at the electrical degree at which the residual magnetic flux and the stationary magnetic flux thereof are substantially coincident with each other, occurrence of the transitional phenomenon of the magnetic flux can be suppressed, and occurrence of magnetic saturation can be suppressed because the magnetic flux becomes symmetrical magnetic flux, so that the transitional exciting incoming current caused by the switching of the switching device which is severe to the transforming unit can be suppressed to the minimum level.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Preferred embodiments according to the present invention will be described hereunder with reference to the accompanying drawings.

First Embodiment

Figure 1:
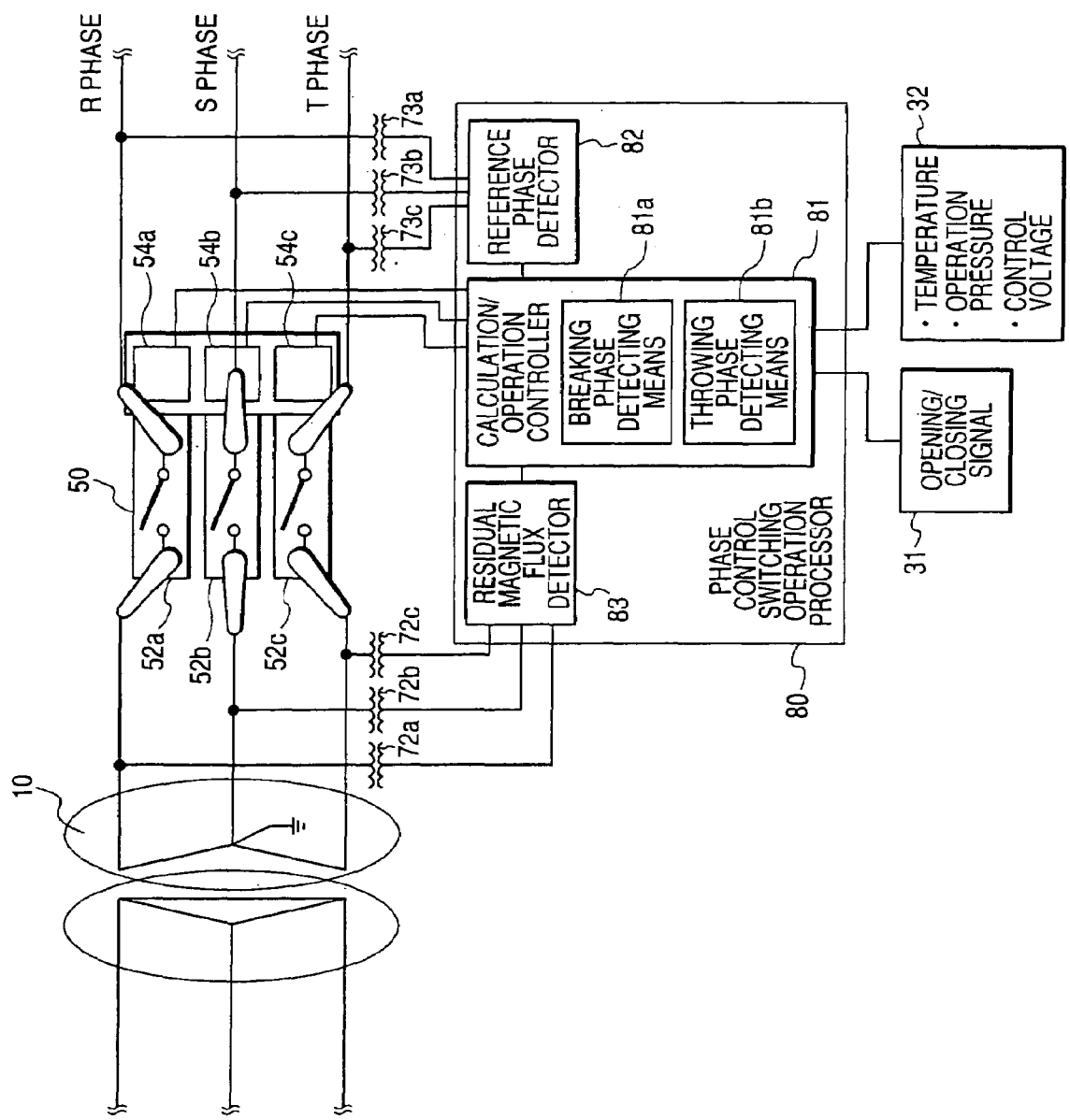
FIG. 1 is a block diagram showing the construction of a phase control switching device according to an embodiment of the present invention.

FIG. 1 is a block diagram showing the construction of a phase control switching device according to a first embodiment of the present invention. In FIG. 1, reference numeral 10 represents a transforming unit such as a transformer or a shunt reactor, and it is representatively indicated by a transformer 10. The transformer 10 is connected to a power system of an electric feeder line through a breaker 50. In order to allow contact terminals in arc-suppressing rooms 52a, 52b, 52c of the breaker 50 to independently carry out a switching (opening/closing) operation, independent operating devices 54a, 54b, 54c are provided. Voltage measuring units 72a, 72b, 72c and 73a, 73b, 73c are respectively provided between the transformer 10 of each R, S, T phase and the breaker 50 and at the power system side of the breaker 50 of each R, S, T phase. A phase control switching operation processor 80 comprises a computer or the like, and contains a reference phase detector 82, a calculation/operation controller 81 and a residual magnetic flux detector 83 as functions. Furthermore, an opening/closing signal 31, and measurement data 32 of the ambient temperature, operation pressure and control voltage of the operating devices 54a, 54b, 54c are input to the calculation/operation controller 81. The opening/closing signal 31 is an opening/closing instruction to the breaker 50.

Figure 2:
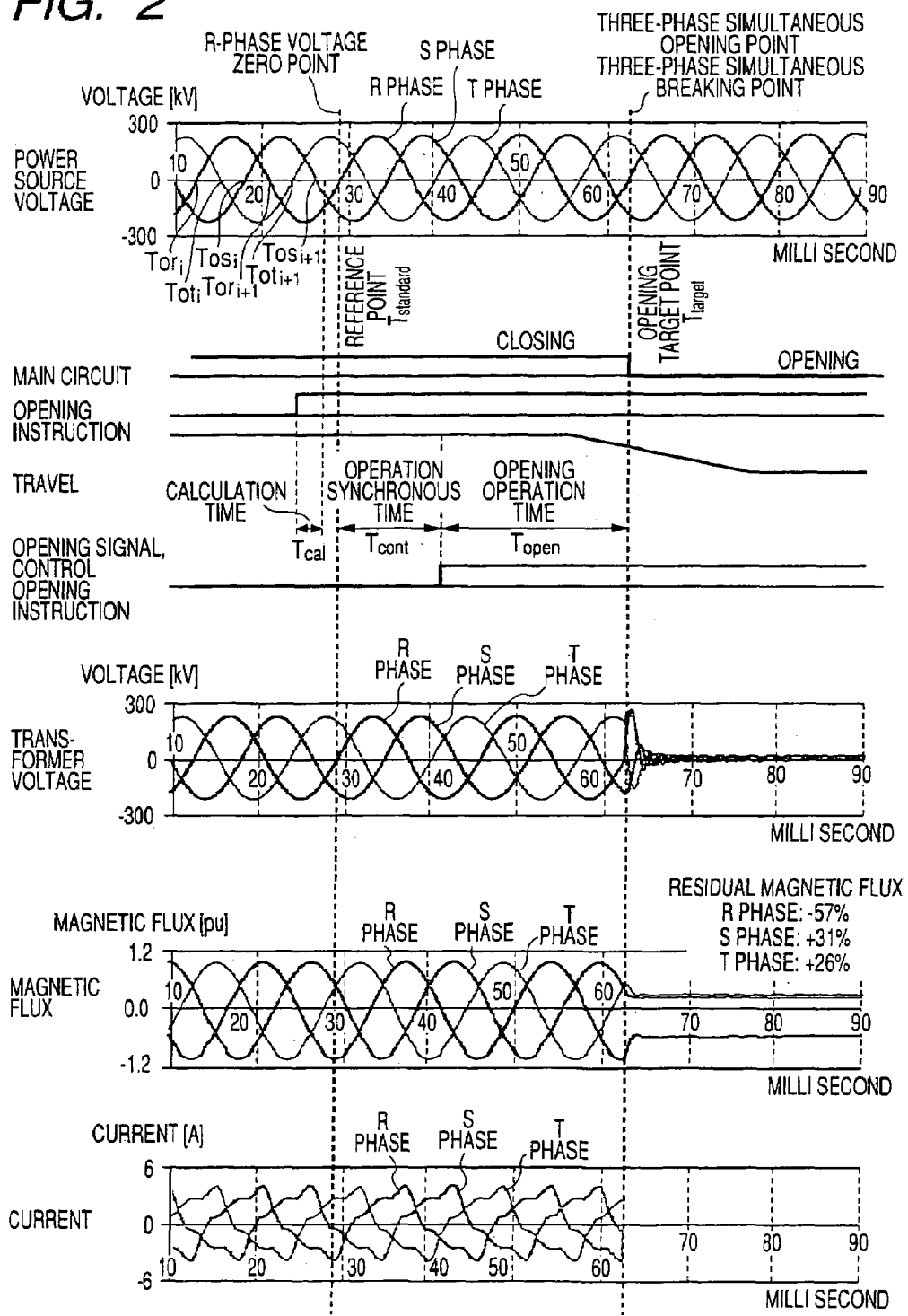
FIG. 2 is a timing chart showing the behaviors of voltage, current, magnetic flux, etc. of each phase to explain an opening operation of the phase control switching device according to the present invention.

FIG. 2 is a timing chart showing the behaviors of voltage, current and magnetic flux of each phase to explain the opening operation of the phase control switching device in this invention. FIG. 2 shows, from the upper side, the voltage of the power system side of each phase (referred to as power source voltage), a main circuit contact point (referred to as main circuit) of each contact terminal in the arc-suppressing rooms 52a, 52b, 52c of the breaker 50 of each phase, an opening instruction to the breaker 50 of each phase, an operation process (referred to as travel) of the breaker 50 of each phase, an opening signal to the breaker 50 of each phase, a transformer voltage of each phase, magnetic flux of the transformer estimated on the basis of the transformer voltage of each phase, and current flowing in the breaker 50 of each phase. Tori, Tori+1, Toti, Toti+1, Tosi, Tosi+1 of FIG. 2 represent the voltage zero points of the respective phases.

The opening operation of the phase control switching device will be described with reference to FIG. 2. The voltages of the respective R, S, T phases are measured at all times by the corresponding voltage measuring units 72a, 72b, 72c and 73a, 73b, 73c, and transmitted to the residual magnetic flux detector 83 and the reference phase detector 82 of the phase control switching operation processor 80. When the breaker 50 receives an opening instruction, by using the opening instruction as a trigger, the residual magnetic flux detector 83 calculates the residual magnetic flux of the transformer 10 of each phase on the basis of the voltage values measured from the voltage measuring units 72a, 72b, 72c equipped to the transformer side of the breaker 50 of each phase before and after the opening instruction is received. In the reference phase detector 82, the phase of the voltage waveform of each of the R, S, T phases and the period of the voltage zero points are detected on the basis of the voltage values measured from the voltage measuring units 73a, 73b, 73c equipped to the power system side of the breaker 50 of each phase. The periodical voltage zero points of each phase can be estimated by the above detection.

When the breaker 50 receives the opening instruction, the calculation/operation controller 81 sets as a reference point Tstandard a voltage zero point of a phase which first encounters the voltage zero point after lapse of a calculation time Tcal, for example, the voltage zero point of the R phase as shown in FIG. 2. The calculation/operation controller 81 calculates an opening operation time Topen to be estimated on the basis of measurement data of the ambient temperature, the operation pressure and the control voltage of the operating devices 54a, 54b, 54c, and also calculates an operation synchronous time Tcont by subtracting the estimated opening operation time Topen from the time period from the opening time (electrical degree) point of the voltage zero point of the phase serving as the reference (opening target point) till the reference point Tstandard (breaking phase detecting means 81a) The calculation time Tcal of the calculation/operation controller 81 corresponds to the time period from the time when the breaker 50 receives the opening instruction till the time when the operation synchronous time Tcont for determining the phase with which the opening signal is transmitted is calculated.

The calculation/operation controller 81 supplies an opening signal to each phase operating device 54a, 54b, 54c after lapse of the operation synchronous time Tcont calculated from the reference point Tstandard to control each phase operating device 54a, 54b, 54c so that the respective contact terminals in the respective arc-suppressing rooms 52a, 52b, 52c carry out the opening operation simultaneously with respect to the three phases at predetermined electrical degrees, thereby carrying out current breaking for the three phases at the same time.

For example, when the respective contact terminals in the arc-suppressing rooms 52a, 52b, 52c are opened at the voltage zero point of the R phase at the same time with respect to the three phases to break current as shown in FIG. 2, with respect to the residual magnetic flux level of each phase, the R phase which is broken at the voltage zero point has the maximum residual magnetic flux (−57%), and the other phases (S phase and T phase) are opposite in polarity to the residual magnetic level of the R phase which is broken at the voltage zero point and are substantially equal to about a half of the residual magnetic level of the R phase (+31% and +26%).

This corresponds to a point at which the R phase is broken at the voltage zero point has the maximum residual magnetic flux level and the S phase and the T phase have the half of the residual magnetic flux level of the R phase. Exciting inductance of the transformer 10 occurring after the current breaking and the transitional vibration of the voltage due to the circuit condition of the surroundings are sharply attenuated and converted to a fixed value, and the magnetic flux is more slightly attenuated than the magnetic flux level at the current breaking point and converged to a fixed value. Therefore, it is apparent that the residual magnetic flux levels of the respective phases of the transformer can be controlled so that by opening the contact terminals in the arc-suppressing rooms 52a, 52b, 52c of the breaker 50 at the voltage zero point of any one phase (in this embodiment, R phase) of the three phases at the same time with respect to the three phases to break current, the residual magnetic flux level of the phase broken at the voltage zero point (for example, the R phase in this embodiment) is set to the maximum value (for example, −2K or +2K), and the residual magnetic flux levels of the other two phases (S phase and T phase) are set to substantially the same magnetic flux level (for example, +K and +K, or −K and −K) which is opposite in polarity to the residual magnetic flux level of the phase broken at the voltage zero point and half in magnitude of the residual magnitude flux level of the phase.

Figure 3:
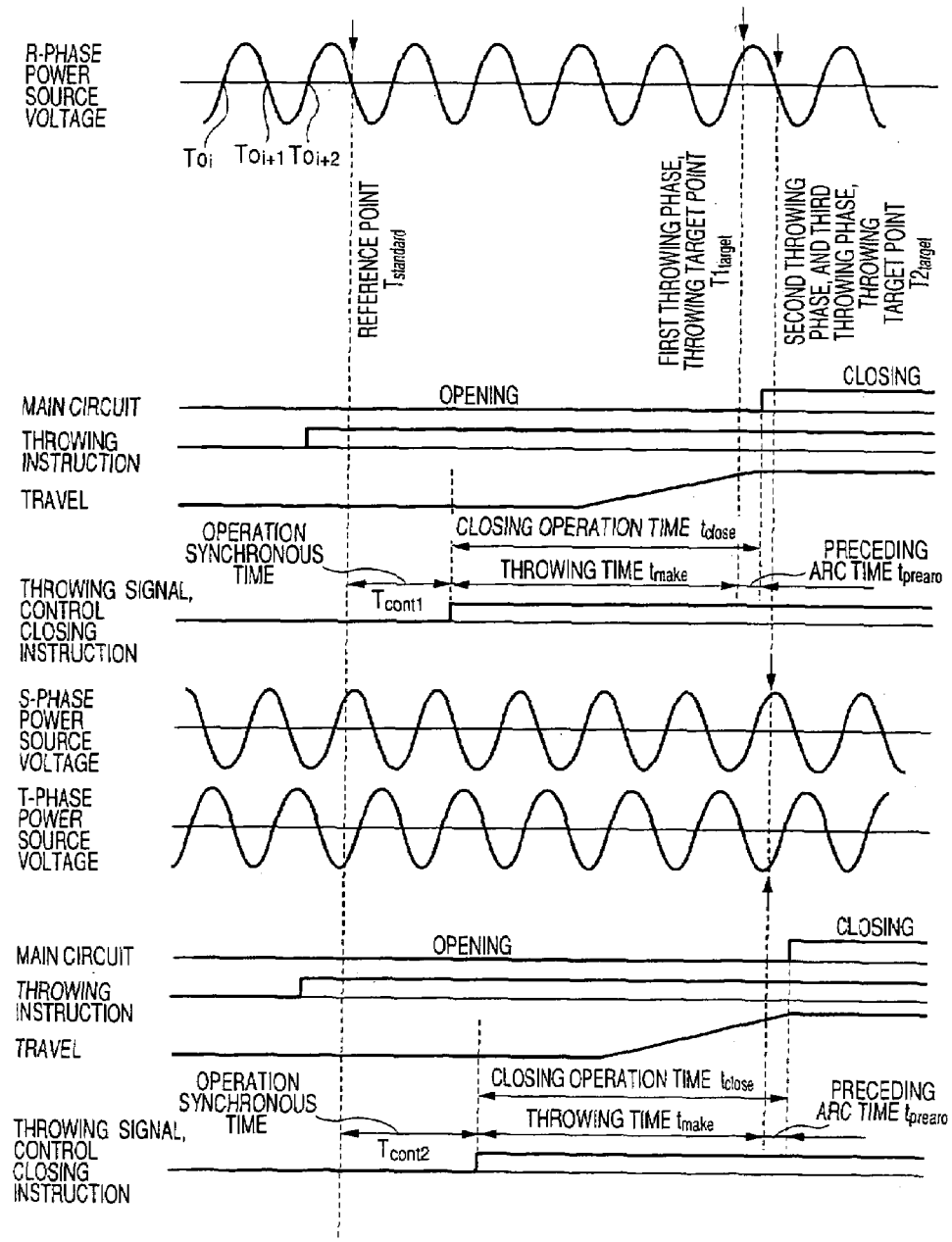
FIG. 3 is a timing chart showing an closing operation of the phase control switching device of the present invention.

FIG. 3 is a timing chart showing the closing operation of the phase control switching device of the present invention. The closing operation of the reference phase detector 82 and the calculation/operation controller 81 of the phase control switching operation processor 80 will be described according to the timing chart of the voltage, etc. of the respective parts of FIG. 3. In the reference phase detector 82, the phase of the voltage waveform of each of the R, S and T phases and the period of voltage zero points thereof are detected on the basis of voltage values measured by the voltage measuring units 73a, 73b, 73c equipped to the power system side of the breaker 50 of each phase. By detecting, the periodical voltage zero points of each phase can be estimated.

When the beaker 50 receives a closing instruction (throwing instruction), the calculation/operation controller 81 sets, as a reference point Tstandard, the voltage zero point of the phase serving as a reference (for example, the R phase serving as the reference point Ttargtet as shown in FIG. 2) when the opening operation is carried out after lapse of the calculation time Tcal.

The calculation/operation controller 81 calculates the closing operation time Tclose and the preceding arc time Tprearc of each phase of the breaker 50 which can be estimated from the measurement data of the ambient temperature of the operating devices 54a, 54b, 54c, the operating pressure thereof and the control voltage. In addition, the phase which is set as a reference when the opening operation is carried out (for example, the R phase set as the reference point Ttarget as shown in FIG. 2) is set as first throwing phase, and the optimal closing time (electrical degree) point T1target (the point at which the residual magnetic flux of each phase of the transformer is coincident with the stationary magnetic flux) at which the exciting incoming current at the throwing time is minimum is set as a first throwing phase throwing target point in consideration of the residual magnetic flux of the transformer. In addition, the optimal closing time (electrical degree) point T2target (the point at which the residual magnetic flux of each phase of the transformer is coincident with the stationary magnetic flux) at which the exciting incoming current at the throwing time of the second throwing phase and the third throwing phase is minimum is set as the voltage zero point of the first throwing phase at any time (electrical degree) subsequent to the closing time point T1target of the first throwing phase and as the throwing target point of the second throwing phase and the third throwing phase.

The operation synchronous time Tcont1, Tcont2 are calculated by subtracting the estimated closing operation time Tclose from the time from T1target and T2target till the reference point Tstandard and adding the subtraction result with the preceding arc time Tprearc (throwing phase detecting means 81b). The operation synchronous time Tcont1 is used for the first throwing phase (R phase), and the operation synchronous time Tcont2 is used for the second throwing phase and the third throwing phase (S phase and T phase). The calculation/operation controller 81 supplies the closing signal (throwing signal) to the operation device 54a of the first throwing phase (R phase) after lapse of the operation synchronous time Tcont1 calculated from the reference point Tstandard, and supplies the closing signal (throwing signal) to the operating devices 54b and 54c of the second throwing phase and the third throwing phase (S phase and T phase) after lapse of the operation synchronous time Tcont2 calculated from the reference point Tstandard, and controls the operating devices so that the respective contact terminals in the arc-suppressing rooms 52a, 52b, 52c carry out the closing operation (throwing operation) at predetermined electrical degrees.

In the foregoing description, the same closing operation time Tclose is used for the first throwing phase (R phase), the second throwing phase (S phase) and the third throwing phase (T phase). However, when different closing operation times Tclose are used, it is necessary that the operation synchronous time Tcont1 is determined from the closing operation time Tcloser for the first throwing phase (R phase), the operation synchronous time Tcont2s is determined from the closing operation time Tcloses for the second throwing phase (S phase) and the operation synchronous time Tcont2t is determined from the closing operation time Tcloset for the third throwing phase (T phase).

Figure 4:
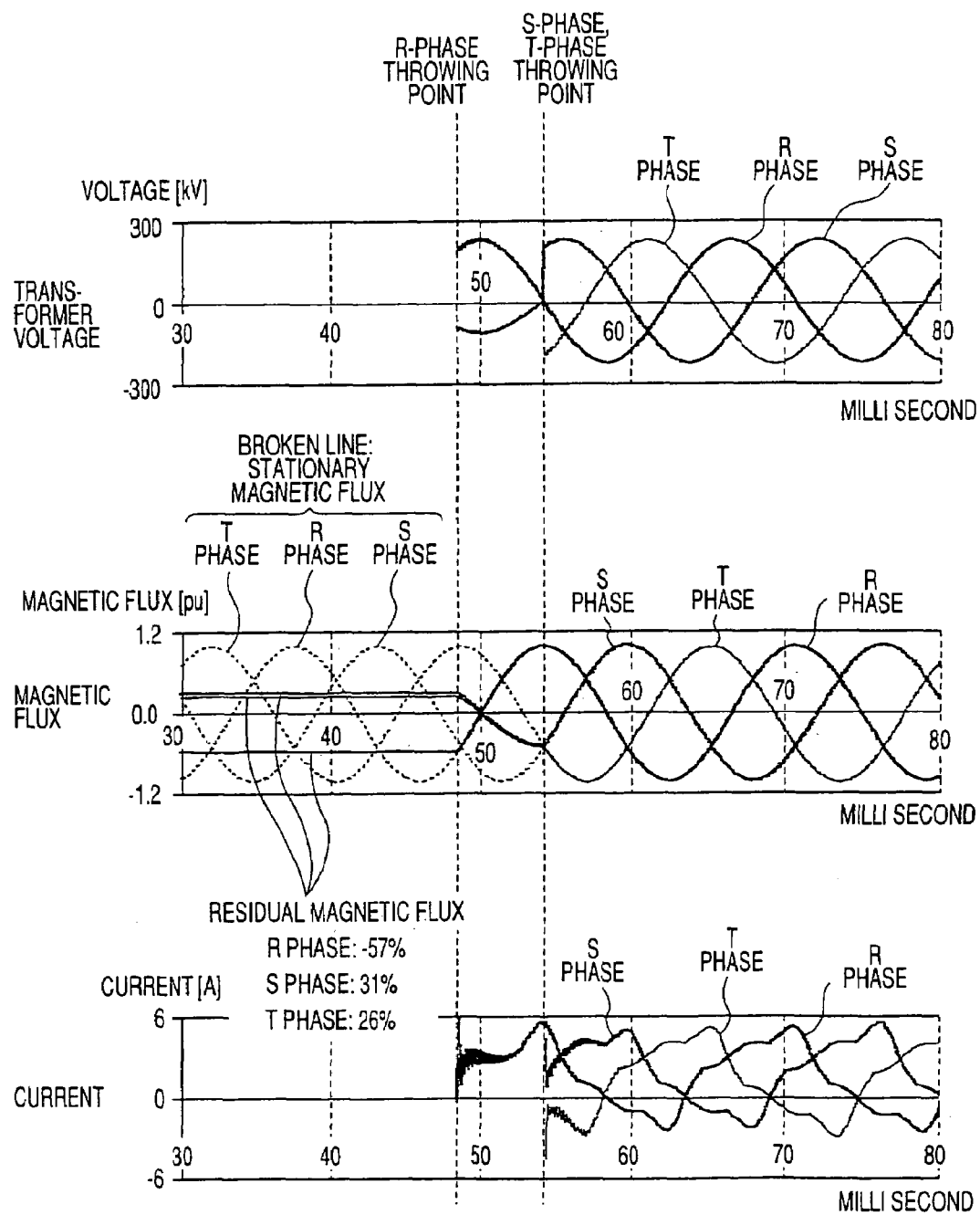
FIG. 4 is a timing chart showing the behaviors of voltage, current and magnetic flux of each phase in the closing operation in the timing chart of FIG. 3.

FIG. 4 is a timing chart showing the behaviors of the voltage, current and magnetic flux of each phase to the closing operation in the timing chart of FIG. 3, and shows the behaviors of the voltage, current and the magnetic flux of each phase when the closing operation of the breaker 50 is carried out according to the timing chart of the closing operation of the reference phase detector 82 and the calculation/operation controller 81 of the phase control switching operation processor 80 of FIG. 3. In FIG. 4, the voltage of the transformer 10 of each phase, the transformer magnetic flux of each phase estimated from the voltage of the transformer 10 of each phase, and current flowing in the breaker 50 of each phase are shown from the upper side. As shown in FIG. 2, the residual magnetic flux level of the R phase broken at the voltage zero point is equal to −57%, and the residual magnetic levels of the other S phase and T phase are equal to +31% and +26%, respectively.

From FIG. 4, the R phase set as the reference when the opening operation is carried out is set as the first throwing phase, and in consideration of the residual magnetic flux of the transformer, it is thrown at the optimal closing time (electrical degree) point (the point at which the residual magnetic flux of the R phase of the transformer is coincident with the stationary magnetic flux) at which the exciting incoming current at the throwing time is minimum. The other S phase and T phase are set as the second throwing phase and the third throwing phase, and the optimal closing time (electrical degree) point (the point at which the residual magnetic flux of each phase of the transformer is coincident with the stationary magnetic flux) is set as the voltage zero point of the first throwing phase at any time (electrical degree) subsequent to the closing time (electrical degree) point at which the exciting incoming current at the throwing time of the first throwing phase is minimum, and the phases are thrown. Accordingly, the difference in residual magnetic flux between the second throwing phase and the third throwing phase just after the throwing time of the first phase can be made substantially equal to zero. The throwing can be carried out at the electrical degree at which the residual magnetic flux of the second throwing phase and the third throwing phase are substantially coincident with the stationary magnetic flux. Therefore, no transitional phenomenon of magnetic flux occurs, and no magnetic saturation occurs because of symmetrical magnetic flux, so that the transitional exciting incoming current caused by the switching of the switching device which is severe to the transformer can be suppressed to the minimum level.

In the first embodiment, when the breaker of each phase receives an opening instruction, the phase control switching operation processor may be equipped with a function of setting an intermediate phase at the intermediate position in the electric feeder line of the power system. In this case, a phase specified as one phase (a phase which is opened at a voltage zero point) can be set as the intermediate phase.

Furthermore, in the first embodiment, when the breaker of each phase receives an opening instruction, the phase control switching operation processor may be equipped with a function of setting a specific phase of end phases disposed at both the ends in the electric feeder line of the power system. In this case, a phase specified as one phase (a phase which is opened at a voltage zero point) can be set as any specific phase of the end phases.

Second Embodiment

In the first embodiment, the voltage measuring unit for measuring the voltages at the transforming unit side of the breaker and the power system side is equipped with a breaker of each phase. If the phase control switching operation processor is equipped with a function of setting any specific phase of the three phases when the breaker of each phase receives an opening instruction, the voltage measuring unit for measuring the voltages at the transforming unit side of the breaker and the power system side may be equipped to the breaker for the specific phase.

As described above, the phase control switching device is equipped with the transforming unit connected to the power system, the breaker, which is connected to the transforming unit, of each phase which is thrown to break failure current or load current of the transforming unit and excites the transforming unit, a voltage measuring unit for measuring the voltages at the transforming unit and the power system side of the breaker of any specific phase of three phases, and a phase control switching operation processor for carrying out the switching operation of the breaker of each phase in consideration of the residual magnetic flux of the transforming unit, wherein when the breaker of each phase receives an opening instruction, the phase control switching operation processor, sets the specific phase, estimates a periodical zero point of the specific phase on the basis of the phase of a voltage waveform measured by the voltage measuring unit equipped to the specific phase, opens each contact terminal of the breaker in the vicinity of the voltage zero point of the specific phase at the same time with respect to the three phases. When the breaker of each phase receives a closing instruction, the phase control switching operation processor estimates the periodic zero point of the specific phase from the phase of the voltage waveform of the specific phase measured by the voltage measuring unit of the specific phase, sets the specific phase opened at the voltage zero point as a first throwing phase and throws the specific phase at a throwing point at which the exciting incoming current at the throwing point is substantially minimum in consideration of the residual magnetic flux of the transforming unit, and throws the other phases in the vicinity of the voltage zero point of the specific phase after the throwing point of the specific phase.

In the above construction of the second embodiment, the specific phase corresponds to the intermediate phase disposed in the middle point of the electric feeder line of the power system, and the voltage measuring unit may measure the voltage of the intermediate phase.

Furthermore, in the above construction of the second embodiment, the specific phase is any specific phase of the end phases disposed at both the ends in the electric feeder line of the power system, and the voltage measuring unit may measure the voltage of any specific phase of the end phases.

While the presently preferred embodiments of the present invention have been shown and described. It is to be understood that these disclosures are for the purpose of illustration and that various changes and modifications may be made without departing from the scope of the invention as set for in the appended claims.

What is claimed is:

1. A phase control switching device comprising:
   a transforming unit having multiple phases and connected to a power system;
   a breaker, having multiple phases and connecting the transforming unit to the power system, each phase of the breaker being opened to break a failure current and a load current of the transforming unit and closed to excite the transforming unit;
   a voltage measuring unit for measuring the voltages of each phase of the breaker at a transforming unit side and at a power system side of the breaker; and a phase control switching operation processor for carrying out switching of each phase of the breaker in consideration of residual magnetic flux of the transforming unit, wherein when each phase of the breaker receives an opening instruction, the phase control switching operation processor estimates a periodic voltage zero point of a first phase from the phase of a voltage waveform measured for each phase by the voltage measuring unit and opens each contact terminal of the breaker near the voltage zero point of the first phase, at the same time with respect to all phases, and, when each phase of the breaker receives a closing instruction, the phase control switching operation processor estimates a periodic voltage zero point of the first phase from the phase of the voltage waveform of the first phase measured by the voltage measuring unit, sets the first phase opened at the voltage zero point as a first throwing phase, throws the first phase at a throwing point at which exciting incoming current at the throwing is substantially a minimum, considering the residual magnetic flux of the transforming unit, and throws other phases near the voltage zero point of the first phase, after the throwing point of the first phase.

2. The phase control switching device according to claim 1, wherein the first phase for which the periodic voltage zero point is estimated from the phase of the voltage waveform measured by the voltage measuring unit corresponds to the phase which first encounters a voltage zero point after lapse of calculation time needed to identify the first phase for emission of an opening signal by the phase control switching operation processor, when each phase of the breaker receives the opening instruction.

3. The phase control switching device according to claim 1, wherein the first phase is set as a first throwing phase, and a throwing point at which exciting incoming current at the throwing time, considering the residual magnetic flux of the transforming unit is substantially a minimum, corresponds to a point at which the residual magnetic flux of the first phase of the transforming unit is substantially coincident with stationary magnetic flux.

4. The phase control switching device according to claim 1, wherein the phase control switching operation processor sets an intermediate phase of an electric feeder line of a power system when each phase of the breaker receives the opening instruction, and the first phase corresponds to the intermediate phase.

5. The phase control switching device according to claim 1, wherein the phase control switching operation processor sets any phase of end phases, disposed at both ends of an electric feeder line of a power system, when each phase of the breaker receives the opening instruction, and the first phase corresponds to any phase of the end phases.

6. A phase control switching device comprising:
a transforming unit having three phases and connected to a power system;
a breaker, having three phases and connecting the transforming unit to the power system, each phase of the breaker being opened to break a failure current and a load current of the transforming unit and closed to excite the transforming unit;
a voltage measuring unit for measuring the voltages at a transforming unit side and a power system side of any specific phase of the three phases of the breaker, and
a phase control switching operation processor for switching of each phase of the breaker, considering residual magnetic flux of the transforming unit, wherein, when each phase of the breaker receives an opening instruction, the phase control switching operation processing sets the specific phase, estimates a periodic voltage zero point of the specific phase based on the phase of the voltage waveform measured for the specific phase by the voltage measuring unit, opens each contact terminal of the breaker near the voltage zero point of the specific phase at the same time with respect to the three phases, and when the breaker of each phase receives a closing instruction, the phase control switching operation processor estimates the periodic voltage zero point of the specific phase from the phase of the voltage waveform of the specific phase measured for the specific phase by the voltage measuring unit, sets the specific phase opened at the voltage zero point as a first throwing phase and throws the specific phase at a throwing point at which exciting incoming current at the throwing point is substantially a minimum, considering the residual magnetic flux of the transforming unit, and throws the other phases near the voltage zero point of the specific phase after the throwing point of the specific phase.

7. The phase control switching device according to claim 6, wherein the specific phase is an intermediate phase of an electric feeder line of a power system, and the voltage measuring unit measures the voltage of the intermediate phase.

8. The phase control switching device according to claim 6, wherein the specific phase is any phase of end phases disposed at both the ends of an electric feeder line of the power system, and the voltage measuring unit measures the voltage of any phase of the end phases.

* * * * *